(12) United States Patent
Dahlfort

(10) Patent No.: US 8,442,401 B2
(45) Date of Patent: May 14, 2013

(54) METHOD AND DEVICE FOR FIBER ACCESS PHYSICAL LAYER UNBUNDLING USING MULTIPLE UPLINK CARDS

(75) Inventor: Stefan Dahlfort, Santa Clara, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 210 days.

(21) Appl. No.: 13/075,300

(22) Filed: Mar. 30, 2011

(65) Prior Publication Data

US 2012/0201542 A1  Aug. 9, 2012

Related U.S. Application Data

(60) Provisional application No. 61/440,551, filed on Feb. 8, 2011.

(51) Int. Cl.
*H04B 10/00* (2006.01)

(52) U.S. Cl.
USPC ............................................. 398/72; 398/67

(58) Field of Classification Search ............... 398/66–72
See application file for complete search history.

(56) References Cited

U.S. PATENT DOCUMENTS

| | | | |
|---|---|---|---|
| 6,288,809 B1 * | 9/2001 | Touma et al. ...................... 398/9 |
| 6,678,474 B1 * | 1/2004 | Masuda et al. .................. 398/75 |
| 7,599,620 B2 * | 10/2009 | Graves et al. .................... 398/51 |
| 7,684,399 B2 * | 3/2010 | Perkins et al. ................. 370/391 |
| 7,852,880 B2 * | 12/2010 | Solomon et al. ............... 370/498 |
| 8,000,603 B2 * | 8/2011 | Coffey ............................. 398/79 |
| 8,027,586 B2 * | 9/2011 | Ikeda et al. ..................... 398/70 |
| 8,073,330 B2 * | 12/2011 | Zheng ............................. 398/66 |
| 8,238,365 B2 * | 8/2012 | Zhao et al. .................... 370/466 |
| 8,300,659 B2 * | 10/2012 | Hinderthuer .................. 370/466 |
| 8,315,527 B2 * | 11/2012 | Kimura ......................... 398/168 |
| 8,346,095 B2 * | 1/2013 | McNaughton et al. ....... 398/168 |
| 2003/0123493 A1 * | 7/2003 | Takahashi ..................... 370/539 |
| 2005/0286521 A1 * | 12/2005 | Chiang et al. ................. 370/389 |
| 2006/0098660 A1 * | 5/2006 | Pal et al. .................. 370/395.51 |
| 2006/0171714 A1 * | 8/2006 | Dove .............................. 398/71 |
| 2007/0211763 A1 * | 9/2007 | Solomon et al. .............. 370/498 |
| 2007/0264015 A1 * | 11/2007 | Li et al. ........................... 398/45 |
| 2008/0019693 A1 * | 1/2008 | Sorin ............................. 398/71 |
| 2009/0047016 A1 * | 2/2009 | Bernard et al. ................. 398/43 |
| 2009/0162063 A1 * | 6/2009 | Mizutani et al. ............... 398/58 |
| 2009/0202246 A1 * | 8/2009 | Kashima ......................... 398/77 |

(Continued)

OTHER PUBLICATIONS

Broadbandtrends: "Unbunding GPON: Bitstream makes most sense . . . for now", Jul. 6, 2010 http://broadbandtrends.com/Report_Summary/BBT_GPONOpenAccess_101200_TOC.pdf.

(Continued)

*Primary Examiner* — Agustin Bello

(57) ABSTRACT

A system, an unbundling optical line terminal (OLT), and a method are described herein that allow at least two service providers (SPs) to use individual fibers of an optical distribution network (ODN). In one embodiment, the unbundling OLT includes one or more wavelength division multiplexing-passive optical network (WDM-PON) line cards and one or more SP uplink cards that enable multiple SPs to each utilize one uplink port to access individual wavelengths of one or more passive optical networks (PONs). In another embodiment, the unbundling OLT includes one or more point-to-point line (p2p) line cards (e.g., p2p fiber Ethernet line cards) and one or more SP uplink cards that enable multiple SPs to each utilize one uplink port to access one or more individual fibers.

20 Claims, 12 Drawing Sheets

U.S. PATENT DOCUMENTS

| | | | | |
|---|---|---|---|---|
| 2009/0245790 | A1* | 10/2009 | Mizutani et al. | 398/43 |
| 2010/0067913 | A1* | 3/2010 | Niibe et al. | 398/98 |
| 2010/0215362 | A1* | 8/2010 | Shimoosako et al. | 398/25 |
| 2010/0269146 | A1* | 10/2010 | Britt | 725/110 |
| 2010/0322626 | A1* | 12/2010 | Kim et al. | 398/63 |
| 2011/0158649 | A1* | 6/2011 | Hari | 398/66 |
| 2012/0045209 | A1* | 2/2012 | Boyd et al. | 398/66 |
| 2012/0201542 | A1* | 8/2012 | Dahlfort | 398/70 |
| 2012/0315035 | A1* | 12/2012 | Stewart | 398/42 |

OTHER PUBLICATIONS http://en.wikipedia.org/wiki/Passive_optical_network.

Gemma Vail-Ilosera: "WDM-PON technology for open access", Workshop 3, Session1, Broadnets 2010, Oct. 25, 2010, Athens, Greece, http://www.broadnets.org/2010/workshop3.shtml.

Ericsson Application: "FTTH Open Access Architectures", Dec. 2010.

Pesavento. G. "Ethernet Passive Optical Network (EPON) Architecture for Broadband Access." Optical Networks Magazine, vol. 4, No. 1 (p. 107-113). Jan. 1, 2003. XP001162954, ISSN: 1388-6916. Bellingham, WA. USA.

Grobe, K, et al. "Einheitlich, Passive WDM als Zugangsloesung fur die zweite Meile." Zeitschrift Fuer Kommunikationsmanagement, vol. 62, No. 12 (pp. 30-34). Dec. 1, 2008. XP001519264, ISSN: 0947-4765. Woltersdorf, DE.

D. Marazza, H. Kleine-Altekamp. "SDH/SONET evolving to a multiservice platform: Multiservice nodes and gateways." Alcatel Telecommunications Review, (pp. 203-210). $3^{rd}$ Quarter, 2000. XP040426871. Paris, France.

* cited by examiner

METHOD AND DEVICE FOR FIBER ACCESS PHYSICAL LAYER UNBUNDLING USING MULTIPLE UPLINK CARDS

CLAIM OF PRIORITY

This application claims the benefit of U.S. Provisional Application Ser. No. 61/440,551 filed on Feb. 8, 2011. The contents of this document are hereby incorporated by reference herein.

TECHNICAL FIELD

The present invention relates to a system, an unbundling optical line terminal (OLT), and a method for allowing at least two service providers (SPs) to use individual fibers of an optical distribution network (ODN). In one embodiment, the unbundling OLT includes one or more wavelength division multiplexing-passive optical network (WDM-PON) line cards and one or more SP uplink cards that enable multiple SPs to each utilize one uplink port to access individual wavelengths of one or more passive optical networks (PONs). In another embodiment, the unbundling OLT includes one or more point-to-point line (p2p) line cards (e.g., p2p fiber Ethernet line cards) and one or more SP uplink cards that enable multiple SPs to each utilize one uplink port to access one or more individual fibers.

BACKGROUND

The following abbreviations are herewith defined, at least some of which are referred to within the following description of the prior art and the present invention.
AWG Arrayed Waveguide Grating
CPRI Common Public Radio Interface
C-VID Customer-VLAN ID
EPON Ethernet PON: IEEE 802.3ah
FTTH Fiber to the Home
GEM GPON Encapsulation Method
GPON Gigabit-capable PON, ITU-T G.984 series
GbE Gigabit Ethernet
ID Identification
MM Multi mode (fiber)
NetOp/NO Network Operator
ODF Optical Distribution Frame
OLT Optical Line Terminal
OIM Optical Interface Module
PON Passive Optical Network
Rx Receiver
SFP Small Formfactor Pluggable Optical Module
SM Single Mode (fiber)
SP Service Provider
S-VID Service-VLAN ID
TDM Time Division Multiplexing
TRx Transceiver
Tx Transmitter
VLAN Virtual Local Area Network
WDM Wavelength Division Multiplexing
XPS Cross-point Switch In the emerging WDM-PON fiber access technology, one of the areas currently attracting a lot of interest relates to enhancing the capability of physical layer unbundling. Physical layer unbundling refers to a network architecture where multiple service providers (SPs) share a common data-link layer to provide voice, video and data services to subscribers. For example, physical layer unbundling allows different service SPs to use the individual wavelengths of a WDM-PON (fiber access network) to provide voice, video and data services to subscribers. In this way, improved competition in fiber access networks would be achieved as described in Broadtrends article: "Unbundling GPON: Bitstream Makes Most Sense . . . For Now" Jul. 6, 2010 (the contents of which are incorporated by reference herein). It is understood that physical layer unbundling, or using the more common term "Open Access", implies a network operator (NetOp, also called NO) being responsible for the operation of the physical network plant and potentially also the physical layer active equipment. The network operator may or may not be the owner of the physical network and may or may not be a SP.

The dominating technology today for fiber access is TDM-PON (EPON, GPON) where the subscriber access to multiple SPs is achieved by L2 open access technologies (see the Broadtrends article). FIG. 1 (PRIOR ART) is a block diagram illustrating the basic architecture of a GPON 100 utilizing an exemplary conventional L2 open access technology. In this N:1 VLAN scheme, each SP 102-1 . . . 120-N uses a S-VID 104-1 . . . 104-N to represent them in the Access and Aggregation network 106 and a corresponding C-VID 108-1 . . . 108-N to represent the end user service (voice, data, video). On the GPON's OLT 110, each end user (ONT 112-1 . . . 112-M in the FTTH case) is represented by a GEM-port 114-1 . . . 114-M. The SP's S-VID 104-1 . . . 104-N is mapped to the end user GEM-port 114-1 . . . 114-M for transport over a PON 115. At the ONT 112-1 . . . 112-M, the end user 116-1 . . . 116-M has access to the selected SP services. For simplicity, just one OLT 110 and one PON 115 from this OLT 110 has been shown. The problem with L2 open access technologies is that the traffic of different SPs 120-1 . . . 120-N need to come together and pass a common packet processing device (e.g., Ethernet switch or similar—located in OLT 110). This architecture where all SPs need to come together gives rise to trust issues in terms of security and fairness as well as some limitations when it comes to service differentiations within the OLT 110 or in an aggregation device upstream from the OLT 110.

Alternatively, TDM-PON can also provide subscriber access to multiple SPs using different L1 open access technologies. FIGS. 2A-2B (PRIOR ART) are block diagrams illustrating the basic architectures of two WDM-PONS 200a and 200b utilizing exemplary conventional L1 open access technologies. In FIG. 2A, the WDM-PON 200a shows the case when the NO is the owner of the active and passive PON equipment 201 (including ONTs 202-1 . . . 202-M, wavelength multiplexers/demultiplexers 204 and 206, an OEO 208 and an ODF 210) which connect SPs 212-1 . . . 212-N to end users 214-1 . . . 214-M. In this case, the NO has to use the ODF 210 and manually patch each SP interface to the OEO port (which translates the SP's optic which are wavelength unspecific to the specific PON wavelength representing an individual end user 214-1 . . . 214-M). If desired, the NO can also make use of an optical switch to replace the manual patching, albeit at a very high cost. In FIG. 2B, the WDM-PON 200b shows the case when the NO is the owner of the passive PON equipment 216 (including wavelength multiplexers/demultiplexers 218 and 220, and an ODF 222) but not the active PON equipment 224 (including ONTs 226-1 . . . 226-M) which connect SPs 228-1 . . . 228-N to end users 230-1 . . . 230-M. In this case, the SP-1 228-1 (for example) has to provide the correct wavelength to the ODF 222. This means that the SP 228-1 risks having unused expensive WDM-ports in case an end user 230-1 (for example) switches to another SP 212-N (for example) or in a case the take rate is slow or unsuccessful. Plus, the SPs 228-1 . . . 228-N need to have a substantial amount of GbE ports (if this is the line speed per wavelength)

and corresponding patch cabling since each port represents one wavelength line (being in service or potentially coming onto service). In both WDM-PONs 200a and 200b it is evident that the number of optical patch cords (cabling) from each SP is substantial, which will increase even more with customer turn-over. Hence, there has been and still is a need enhance the capability of physical layer unbundling (Open Access). This need and other needs are satisfied by the present invention.

SUMMARY

A system, an unbundling OLT, and a method for allowing at least two SPs to use individual fibers of an ODN are described in the independent claims of the present application. Advantageous embodiments of the system, the unbundling OLT, and the method are described in the dependent claims.

In an aspect, the present invention provides a system comprising at least two SPs, a first unbundling OLT, and an optical ODN, wherein the first unbundling OLT is positioned between the at least two SPs and the ODN. The first unbundling OLT comprises a first line card, a backplane, and first uplink card, wherein the first uplink card is coupled by the backplane to the first line card. The first line card includes a multi-channel transmitter-receiver array and a plurality of L1 switches, wherein the multi-channel transmitter-receiver array has a first side coupled to a first set of one or more ODN fibers associated with the ODN and a second side coupled to the plurality of L1 switches, wherein each L1 switch has one port on a first side connected to a port associated with one of the channels on the multi-channel transmitter-receiver array, and wherein each L1 switch has multiple ports on a second side coupled to the backplane. The first uplink card is dedicated to a first SP and is connected by a first uplink port and a first link to the first SP, wherein the first uplink card includes a L2 switch and an OIM, wherein the OIM has a first side connected to the first uplink port which is coupled via the first link to the first SP, wherein the OIM has a second side connected to a first side of the L2 switch, wherein the L2 switch has multiple ports on a second side connected to the backplane such that one of the ports on the L2 switch is coupled via the backplane to one of the multiple ports on the second side of one of the plurality of L1 switches in the first line card, and wherein the first uplink port is shared among all of the channels on the multi-channel transmitter-receiver array which are supported by the first set of one or more ODN fibers. The unbundling OLT enables fiber access physical layer unbundling for WDM-PON and p2p fiber Ethernet while minimizing the need for active (ports etc) and passive optics (patch cord, ODF ports etc) as well as reducing manual labor as a SP acquires or looses resources and subscribers in the access network.

In another aspect, the present invention provides an unbundling OLT that is positioned between at least two SPs and an ODN. The unbundling OLT comprises a first line card, a backplane, and first uplink card, wherein the first uplink card is coupled by the backplane to the first line card. The first line card includes a multi-channel transmitter-receiver array and a plurality of L1 switches, wherein the multi-channel transmitter-receiver array has a first side coupled to a first set of one or more ODN fibers associated with the ODN and a second side coupled to the plurality of L1 switches, wherein each L1 switch has one port on a first side connected to a port associated with one of the channels on the multi-channel transmitter-receiver array, and wherein each L1 switch has multiple ports on a second side coupled to the backplane. The first uplink card is dedicated to a first SP and is connected by a first uplink port and a first link to the first SP, wherein the first uplink card includes a L2 switch and an OIM, wherein the OIM has a first side connected to the first uplink port which is coupled via the first link to the first SP, wherein the OIM has a second side connected to a first side of the L2 switch, wherein the L2 switch has multiple ports on a second side connected to the backplane such that one of the ports on the L2 switch is coupled via the backplane to one of the multiple ports on the second side of one of the plurality of L1 switches in the first line card, and wherein the first uplink port is shared among all of the channels on the multi-channel transmitter-receiver array which are supported by the first set of one or more ODN fibers. The unbundling OLT enables fiber access physical layer unbundling for WDM-PON and p2p fiber Ethernet while minimizing the need for active (ports etc) and passive optics (patch cord, ODF ports etc) as well as reducing manual labor as a SP acquires or looses resources and subscribers in the access network.

In yet another aspect, the present invention provides a method for allowing at least two SPs to use individual fibers of an ODN. The method comprises a step of: (a) positioning an unbundling OLT between the at least two SPs and the ODN. The unbundling OLT comprises a first line card, a backplane, and first uplink card, wherein the first uplink card is coupled by the backplane to the first line card. The first line card includes a multi-channel transmitter-receiver array and a plurality of L1 switches, wherein the multi-channel transmitter-receiver array has a first side coupled to a first set of one or more ODN fibers associated with the ODN and a second side coupled to the plurality of L1 switches, wherein each L1 switch has one port on a first side connected to a port associated with one of the channels on the multi-channel transmitter-receiver array, and wherein each L1 switch has multiple ports on a second side coupled to the backplane. The first uplink card is dedicated to a first SP and is connected by a first uplink port and a first link to the first SP, wherein the first uplink card includes a L2 switch and an OIM, wherein the OIM has a first side connected to the first uplink port which is coupled via the first link to the first SP, wherein the OIM has a second side connected to a first side of the L2 switch, wherein the L2 switch has multiple ports on a second side connected to the backplane such that one of the ports on the L2 switch is coupled via the backplane to one of the multiple ports on the second side of one of the plurality of L1 switches in the first line card, and wherein the first uplink port is shared among all of the channels on the multi-channel transmitter-receiver array which are supported by the first set of one or more ODN fibers. The method also comprises the steps of controlling the plurality of L1 switches to select one or more of the channels of the multi-channel transmitter-receiver array to be used by the first SP. The method further comprises the step of controlling the L2 switch to enable the first uplink port of the first SP to use the first set of one or more ODN fibers associated with the ODN. The unbundling OLT enables fiber access physical layer unbundling for WDM-PON and p2p fiber Ethernet while minimizing the need for active (ports etc) and passive optics (patch cord, ODF ports etc) as well as reducing manual labor as a SP acquires or looses resources and subscribers in the access network.

In still yet another aspect, the present invention provides an unbundling OLT positioned between at least two SPs and at least one PON. The unbundling OLT comprises a first line card, a backplane; and a first uplink card, wherein the first uplink card is coupled by the backplane to the first line card. The first line card includes a WDM multiplexer, a multi-channel transmitter-receiver array and a plurality of L1 switches, wherein the WDM multiplexer has a first side coupled to a first PON and a second side coupled to a first side of the multi-channel transmitter-receiver array which has a second side coupled to the plurality of L1 switches, wherein each L1 switch has one port on a first side connected to a port associated with one of the wavelength channels on the multi-channel transmitter-receiver array, and wherein each L1 switch has multiple ports on a second side coupled to the backplane. The first uplink card is dedicated to a first SP and is connected by a first uplink port and a first optical link to the first SP, wherein the first uplink card includes a L2 switch and an OIM, wherein the OIM has a first side connected to the first uplink port which is coupled via the first optical link to the first SP, wherein the OIM has a second side connected to a first side of the L2 switch, wherein the L2 switch has multiple ports on a second side connected to the backplane such that one of the ports on the L2 switch is coupled via the backplane to one of the multiple ports on the second side of one of the plurality of L1 switches in the first line card, and wherein the first uplink port is shared among all of the wavelength channels on the multi-channel transmitter-receiver array which are supported by the first PON. The unbundling OLT enables fiber access physical layer unbundling for WDM-PON while minimizing the need for active (ports etc) and passive optics (patch cord, ODF ports etc) as well as reducing manual labor as a SP acquires or looses resources and subscribers in the access network.

In still yet another aspect, the present invention provides an unbundling OLT positioned between at least two SPs and multiple fibers. The unbundling OLT comprises a first line card, a backplane, and a first uplink card, wherein the first uplink card is coupled by the backplane to the first line card. The first line card includes a multi-channel transmitter-receiver array and a plurality of L1 switches, wherein the multi-channel transmitter-receiver array has a first side coupled to the multiple fibers and a second side coupled to the plurality of L1 switches, wherein each L1 switch has one port on a first side connected to a port associated with one of the wavelength channels on the multi-channel transmitter-receiver array, and wherein each L1 switch has multiple ports on a second side coupled to the backplane. The first uplink card is dedicated to a first SP and is connected by a first uplink port and a first optical link to the first SP, wherein the first uplink card includes a L2 switch and an OIM, wherein the OIM has a first side connected to the first uplink port which is coupled via the first optical link to the first SP, wherein the OIM has a second side connected to a first side of the L2 switch, wherein the L2 switch has multiple ports on a second side connected to the backplane such that one of the ports on the L2 switch is coupled via the backplane to one of the multiple ports on the second side of one of the plurality of L1 switches in the first line card, and wherein the first uplink port is shared among all of the wavelength channels on the multi-channel transmitter-receiver array which are supported by the multiple fibers. The unbundling OLT enables fiber access physical layer unbundling for p2p fiber Ethernet while minimizing the need for active (ports etc) and passive optics (patch cord, ODF ports etc) as well as reducing manual labor as a SP acquires or looses resources and subscribers in the access network.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

Figure 1:
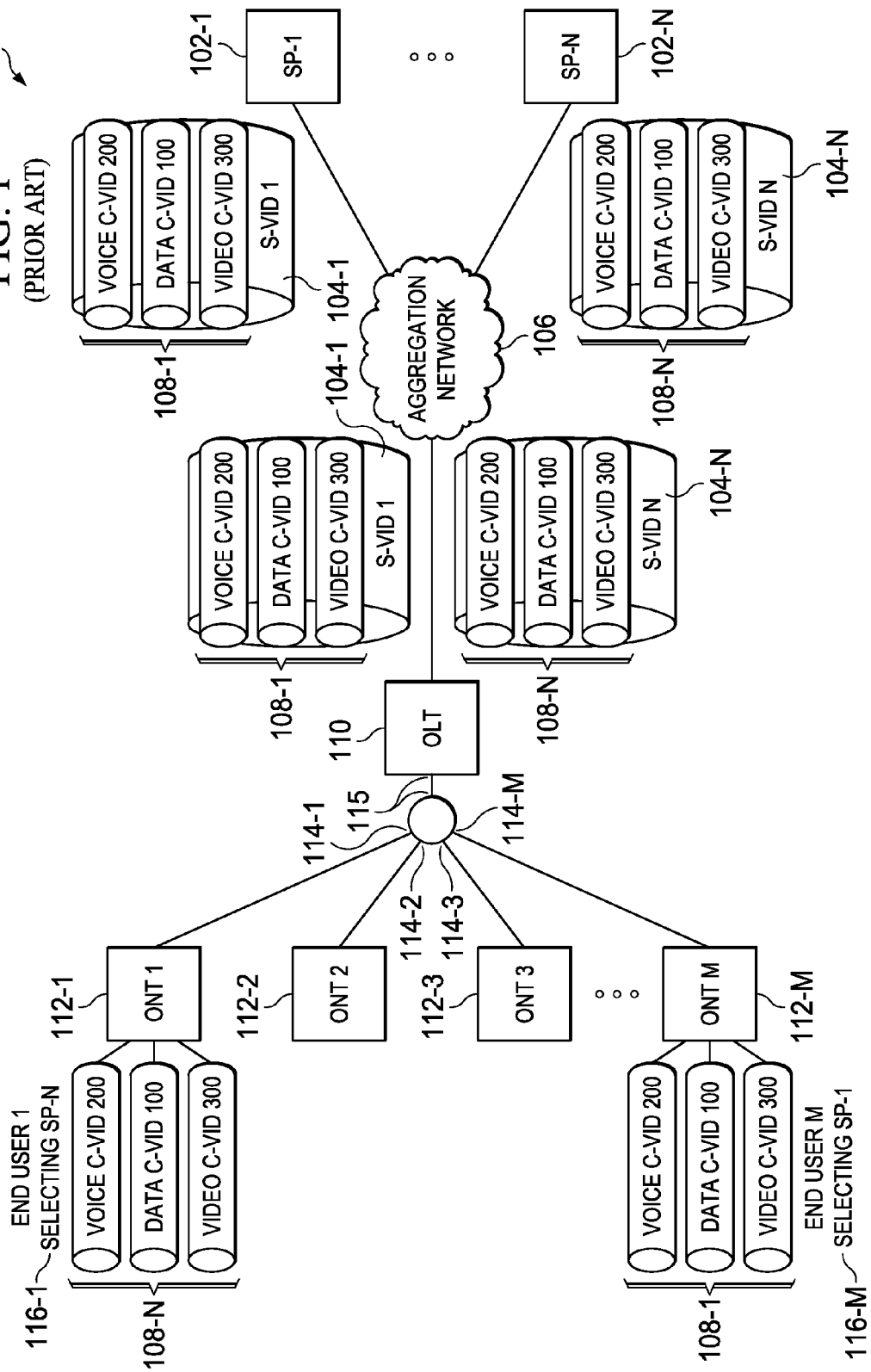
FIG. 1 (PRIOR ART) is a block diagram illustrating the basic architecture of a GPON utilizing an exemplary conventional L2 open access technology.
Figure 2A:
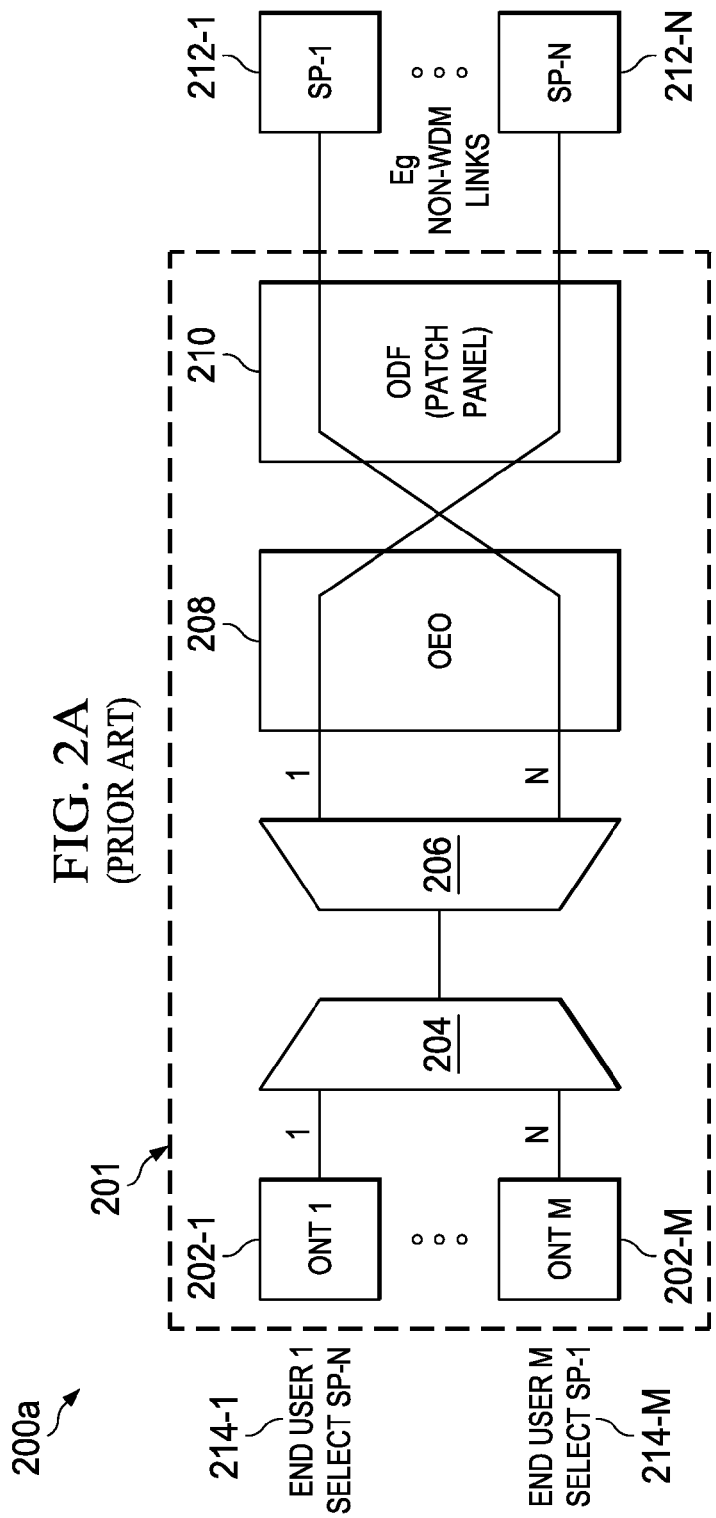
FIGS. 2A-2B (PRIOR ART) are block diagrams illustrating the basic architectures of two WDM-PONs utilizing exemplary conventional L1 open access technologies.
Figure 2B:
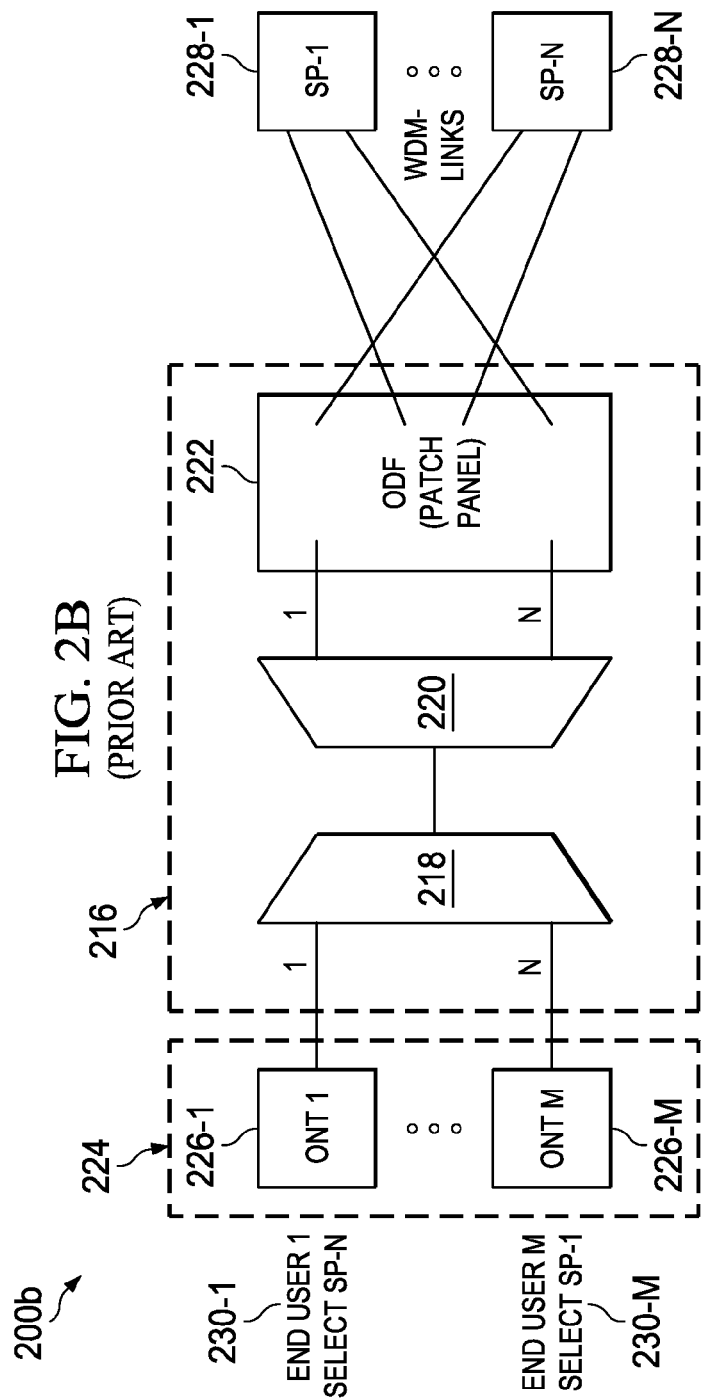
Figure 3:
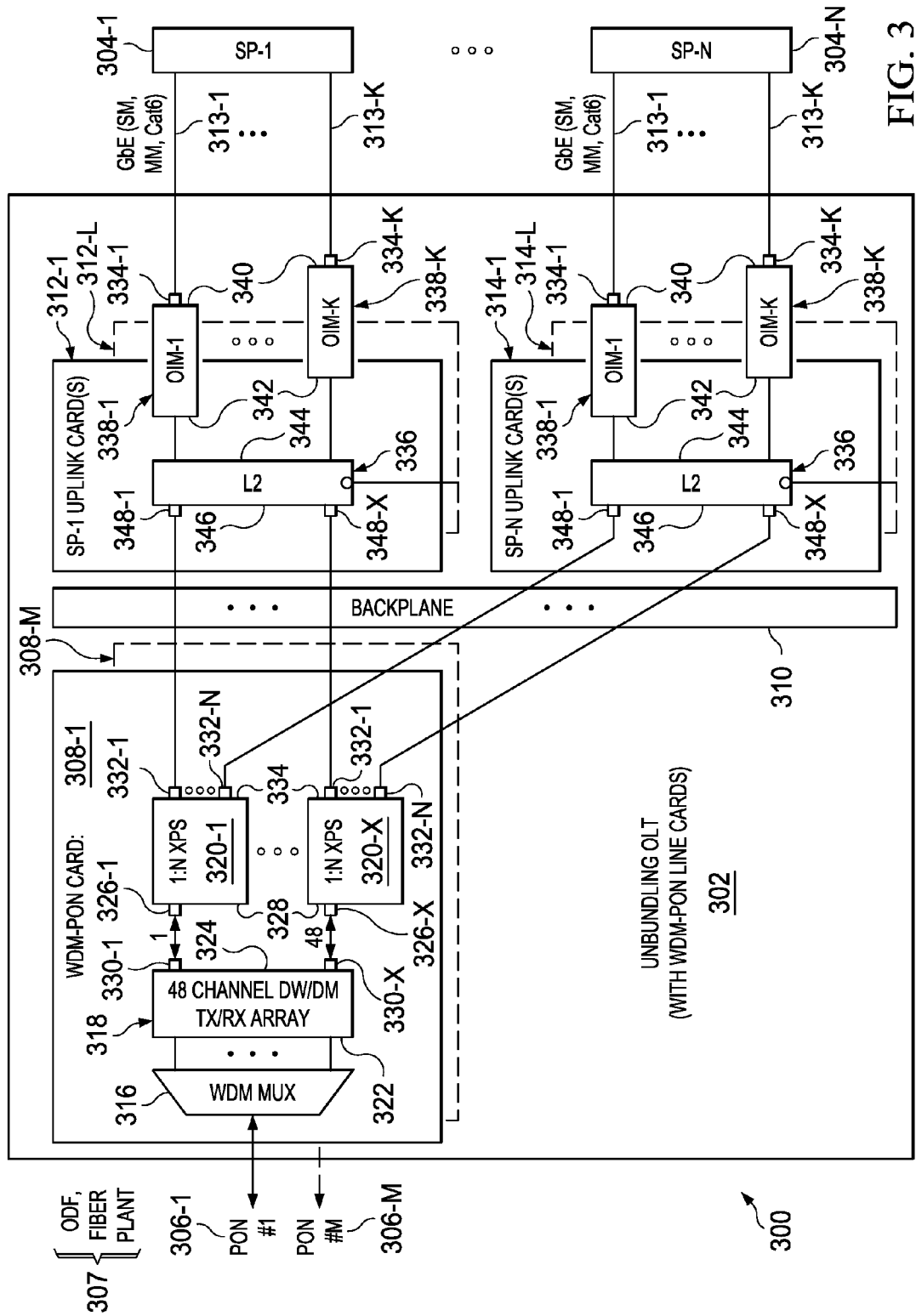
FIGS. 3-5 are block diagrams of an exemplary system which includes one or more unbundling OLTs (including WDM-PON line cards, a backplane, and SP uplink cards) which are positioned between multiple SPs and multiple PONs in accordance with a first embodiment of the present invention.

Referring to FIG. 3, there is shown a block diagram illustrating an exemplary system 300 including an exemplary unbundling OLT 302 positioned between multiple SPs 304-1 . . . 304-N and multiple PONs 306-1 . . . 306-M (e.g., 48 channel GbE PONs 306-1 . . . 306-M associated with ODF 307) in accordance with a first embodiment of the present invention. The unbundling OLT 302 includes one or more WDM-PON line cards 308-1 . . . 308-M, a backplane 310, one or more SP uplink cards 312-1 . . . 312-L (dedicated to SP-1 304-1), and one or more SP uplink cards 314-1 . . . 314-L (dedicated to SP-N 304-N). The WDM-PON line cards 308-1 . . . 308-M are interfaced with the PONs 306-1 . . . 306-M. Plus, the WDM-PON line cards 308-1 . . . 308-M are coupled by the backplane 310 to the SP uplink cards 312-1 . . . 312-L and 314-1 . . . 314-L. Each set of the SP uplink cards 312-1 . . . 312-L and 314-1 . . . 314-L are respectively coupled via one or more links 313-1 . . . 313-K to one of the SPs 304-1 . . . 304-N.

The WDM-PON line cards 308-1 . . . 308-M each include a WDM multiplexer 316, a multi-channel transmitter-receiver array 318 (e.g., 48 channel DWDM Tx/Rx array 318), and multiple L1 switches 320-1 . . . 320-X (e.g., 48 1:N XPSs 320-1 . . . 320-X). As shown, the multi-channel transmitter-receiver array 318 has a first side 322 coupled via the WDM multiplexer 316 to the PON #1 306-1 and a second side 324 coupled to the L1 switches 320-1 . . . 320-X. Each L1 switch 320-1 . . . 320-X has one port 326-1 . . . 326-X on a first side 328 connected to a port 330-1 . . . 330-X associated with one of the wavelength channels on the multi-channel transmitter-receiver array 318. Plus, each L1 switch 320-1 . . . 320-X has multiple ports 332-1 . . . 332-N on a second side 334 coupled to the backplane 310, where each port 332-1 . . . 332-N is associated with one SP 304-1 . . . 304-N.

In this example, the WDM multiplexer 316 (optical mux/demux component 316, AWG 316) is hosted on each WDM-PON line card 308-1 . . . 308-M to reduce optical patch cords.

Plus, the multi-channel transmitter-receiver array 318 is in a common package to reduce the cost of the optical transmitters and receivers. For example, the common package can contain 12 channels or even all the channels (or more) of the corresponding PON 306-1 . . . 306-M. Each electrical Tx/Rx port 330-1 . . . 330-X of the multi-channel transmitter-receiver array 318 is connected to one of the 1:N XPSs 320-1 . . . 320-X which is used to select SP(s) 304-1 . . . 304-N for each WDM-PON wavelength. The XPS performs switching on L1 which is transparent to SP packets and protocols. The 1:N XPSs 320-1 . . . 320-X can be realized using larger XPS: eg a 60 port XPS can in case of 4 SPs be used for 6 wavelengths (Tx+Rx*(1 PON facing port+4 SP ports)=10 ports required for each wavelength). However, MxM XPS allows for more switching possibilities than required for this application and are therefore not optimal in resource utilization. The NetOp can monitor the various parts: the TRx array for optical powers etc, and can also in e.g., a round-robin fashion (using an extra XPS port) monitor the SP packet headers. Thus, the WDM-PON line cards 308-1 . . . 308-M if desired can be totally under the control of the NetOp.

The SP uplink cards 312-1 . . . 312-L and 314-1 . . . 314-L can be totally under the control of their respective SPs 304-1 . . . 304-N. For example, SP-1 304-1 controls SP uplink cards 312-1 . . . 312-L. Each SP uplink card 312-1 (for example) is connected by one or more uplink ports 334-1 . . . 334-K via the links 313-1 . . . 313-K (e.g., GbE (SM, MM, cat6), 10 GbE (SM, MM, Cat6)) to the dedicated SP 304-1 (for example). Each SP uplink card 312-1 (for example) includes a L2 switch 336 which is connected to one or more OIMs 338-1 . . . 338-K (e.g., SFPs 338-1 . . . 338-K) which are connected to the uplink ports 334-1 . . . 334-K. Each OIM 338-1 (for example) has a first side 340 connected to one uplink port 334-1 which is coupled via one link 313-1 to the SP-1 304-1. Each OIM 338-1 has a second side 342 connected to a first side 344 of the L2 switch 336. The L2 switch 336 has a second side 346 with multiple ports 348-1 . . . 348-X connected to the backplane 310 such that one of the ports 348-1 (for example) is coupled to one of the ports 332-1 (for example) on the second side 334 of one of the L1 switches 320-1 (for example) in the WDM-PON line card 308-1 (for example). In this configuration, each uplink port 334-1 . . . 334-K can be shared among all of the wavelength channels on the multi-channel transmitter-receiver array 318 which are supported by PON #1 306-1.

In this example, the L2 switch 336 at the SP uplink card 312-1 (for example) is facing the backplane 310 toward one or more WDM-PON line cards 308-1 . . . 308-M and has a number of ports 348-1 . . . 348-X equal to the number of wavelengths on the one or more WDM-PON line cards 308-1 . . . 308-M. For example, if the SP uplink card 312-1 is made to interface just one 48 wavelength channel WDM-PON line card 308-1, the L2 switch 336 needs to have 48 ports 348-1 . . . 348-X facing the backplane 310 connecting to the WDM-PON line card 308-1. This way, the backplane 310 of the unbundling OLT 302 replaces an optical patch panel as a meeting point for the SP-1 304-1. Such an optical patch panel, typically needed for physical layer unbundling, has problems with a high number of ports and resulting large size. The L2 functionality at the SP uplink card 312-1 enables efficient use of uplink ports 334-1 . . . 334-K and reduces the need for additional hardware and manual labor when the SP-1 304-1 acquires (or loses) a new (existing) wavelength. For instance, one GbE port 334-1 can be shared among all the wavelengths the SP-1 304-1 has on a particular PON #1 306-1. A further improvement comes when one SP-1 304-1 (for example) has multiple SP uplink cards 312-1 . . . 312-L directly connected to one another over the OLT backplane which enables one uplink port 334-1 to be shared among several PONs 306-1 . . . 306-M (see FIG. 4). Further, when one SP-1 304-1 (for example) has one or more SP uplink cards 312-1 . . . 312-L equipped with a number of uplink ports 334-1 . . . 334-K (e.g., both 1 GbE and 10 GbE), these ports 334-1 . . . 334-K can be connected to one or more SP uplink cards dedicated to SP-1 304-1 in one or more OLTs 302 and 302' to enable an increase of uplink capacity as the number of SP wavelengths (i.e., subscribers) increase (see FIGS. 5A and 5B).

Figure 4:
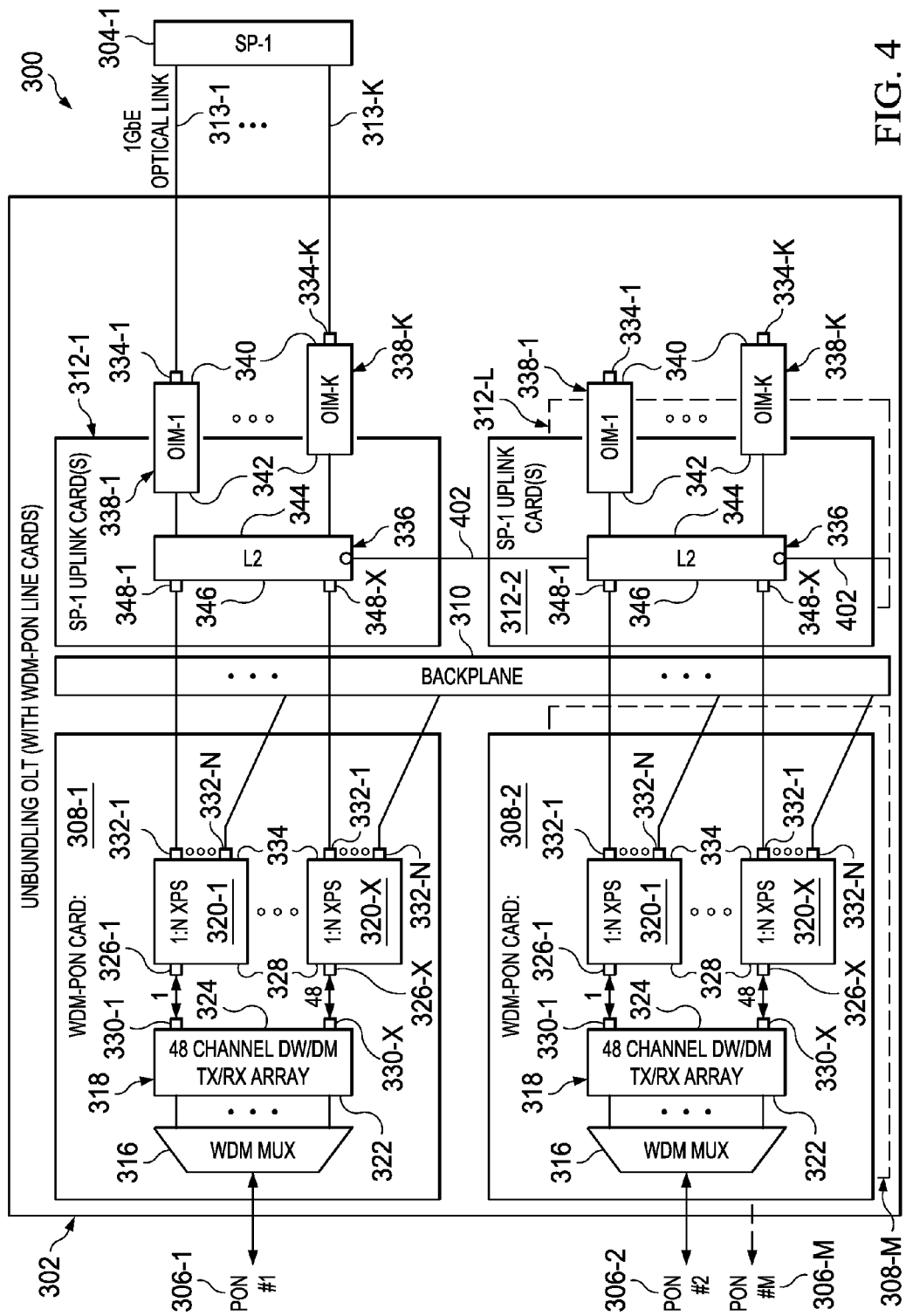

Referring to FIG. 4, there is shown a block diagram of a portion of the exemplary system 300 illustrating in greater detail a scenario where one SP-1 304-1 has multiple SP uplink cards 312-1, 312-2 . . . 312-L each of which are connected to one WDM-PON line card 308-1, 308-2 . . . 308-M in accordance with the first embodiment of the present invention. The components within each of the SP uplink cards 312-1, 312-2 . . . 312-L and the WDM-PON line cards 308-1, 308-2 . . . 308-M have been discussed above and are not repeated here but reference is made to the connections 402 between the SP uplink card's L2 switches 336 which enable one uplink port 334-1 (for example) to be shared among several PONs 306-1, 306-2 . . . 306-M (note: the connections 402 would typically be done via the backplane 310). The uplink ports 334-1 . . . 334-K can be of different media type: SM, MM, Cat6 etc, and speed (e.g., mix of 1 GbE and 10 GbE) to minimize the capital expenditure. The SP 304-1 . . . 304-N's network equipment can be located at remote sites and connected via long-haul optics to the unbundling OLT 302. Also, as each L2 switch 336's functionality is mainly used for aggregation, this functionally is likely rather simple and the more advanced access network related traffic handling (high touch functions like subscriber management etc.) is likely located at the SP's network equipment which connects to the unbundling OLT 302. Finally, as each SP uplink card 312-1, 312-2 . . . 312-L is under the control of a specific SP-1 304-1 (for example) and the traffic is not mixed with any other SP-2 . . . SP-N, the SP-1 304-1 can apply whatever L2 practice they prefer.

Figure 5A:
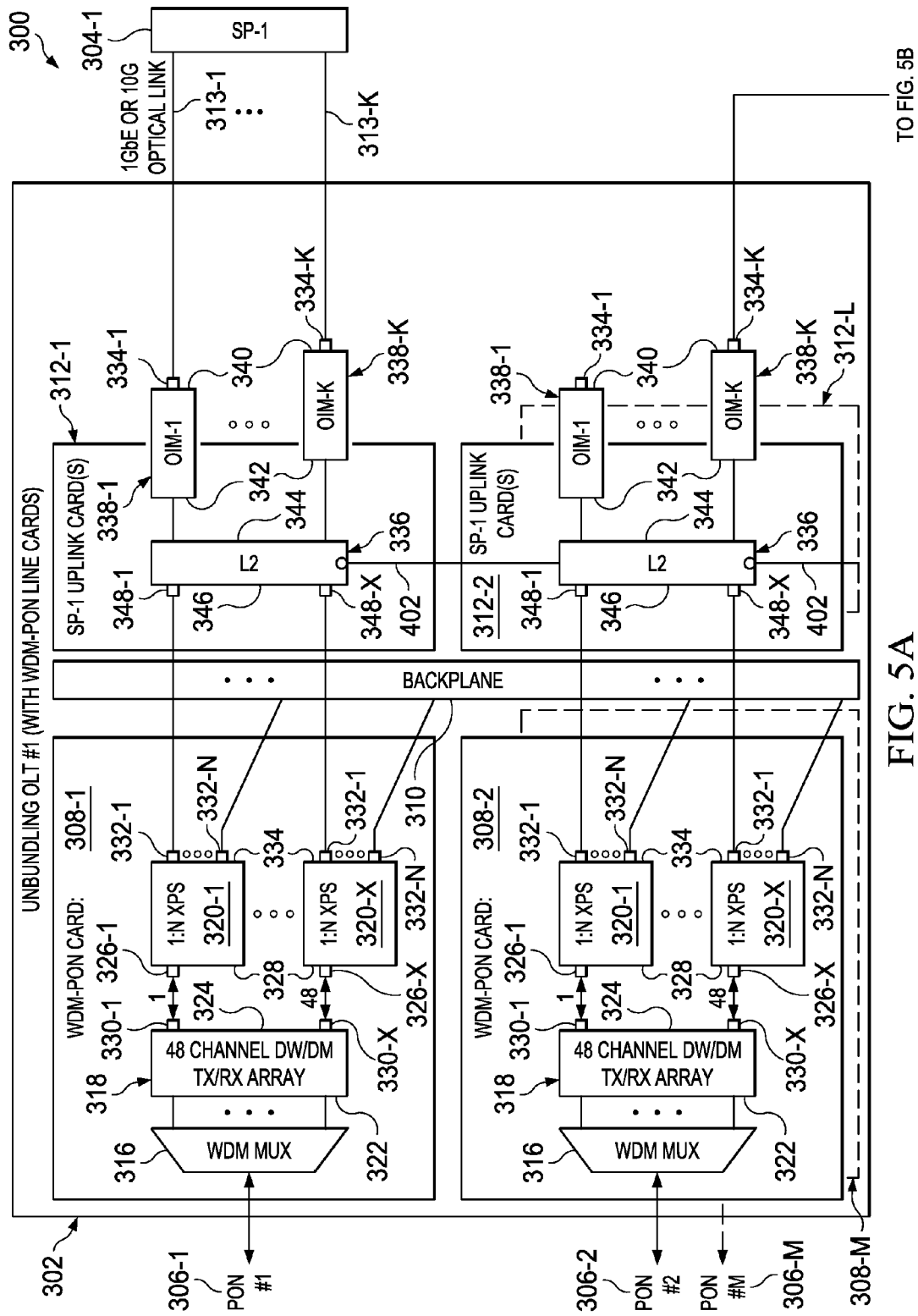
Figure 5B:
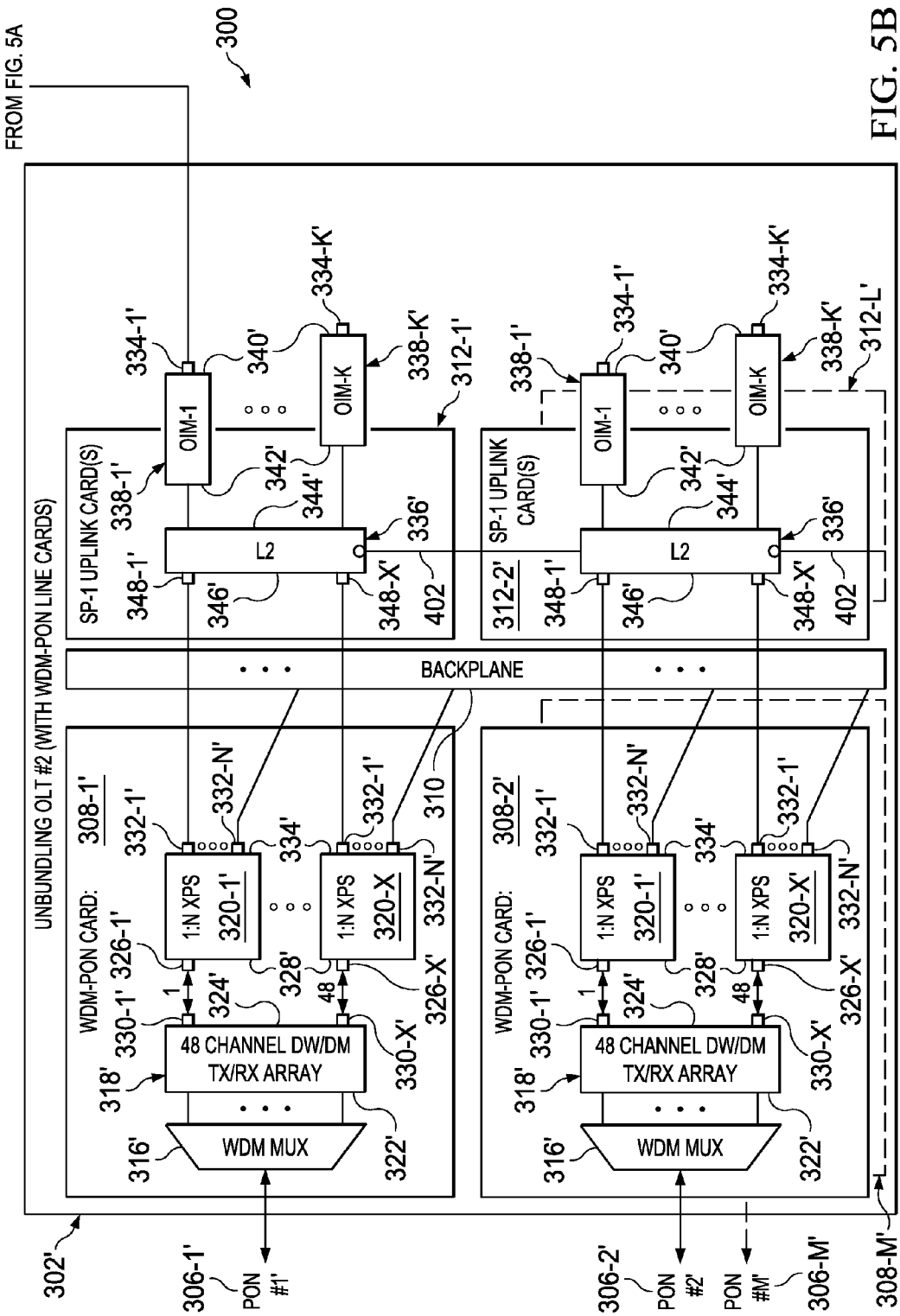

Referring to FIGS. 5A and 5B, there are shown block diagrams of the exemplary system 300 including multiple unbundling OLTs 302 and 302' (only two shown) in accordance with the first embodiment of the present invention. In this example, one SP-1 304-1 (for example) has one uplink port 334-1 (for example) shared among several PONs 306-1, 306-2 . . . 306-M associated with one unbundling OLT 302 and the same uplink port 334-1 is also shared among several PONs 306-1', 306-2' . . . 306-M' associated with a second unbundling OLT 302'. In particular, the one SP-1 304-1 has one uplink port 334-1 shared among several PONs 306-1, 306-2 . . . 306-M associated with one unbundling OLT 302 by connecting multiple SP uplink cards 312-1, 312-2 . . . 312-L to one another via connections 402 between the L2 switches 336 each of which in turn are connected to one WDM-PON line card 308-1, 308-2 . . . 308-M (see FIG. 4). Furthermore, the one SP-1 304-1 has one uplink port 334-1 shared among several PONs 306-1' . . . 306-M' associated with the second unbundling OLT 302' by connecting the OIMs 338-1 . . . 338-K of one SP uplink card 312-1 (for example) in the first unbundling OLT 302 to corresponding OIMs 338-1' . . . 338-K' of one SP uplink card 312-1' (for example) in the second unbundling OLT 302'. The second unbundling OLT 302' is similar to the first unbundling OLT 302 except that the components therein have a reference number of xxx' instead of reference number xxx. If desired, the exemplary system 300 can have any number of unbundling OLTs that may be or may not be connected to one another.

Figure 6:
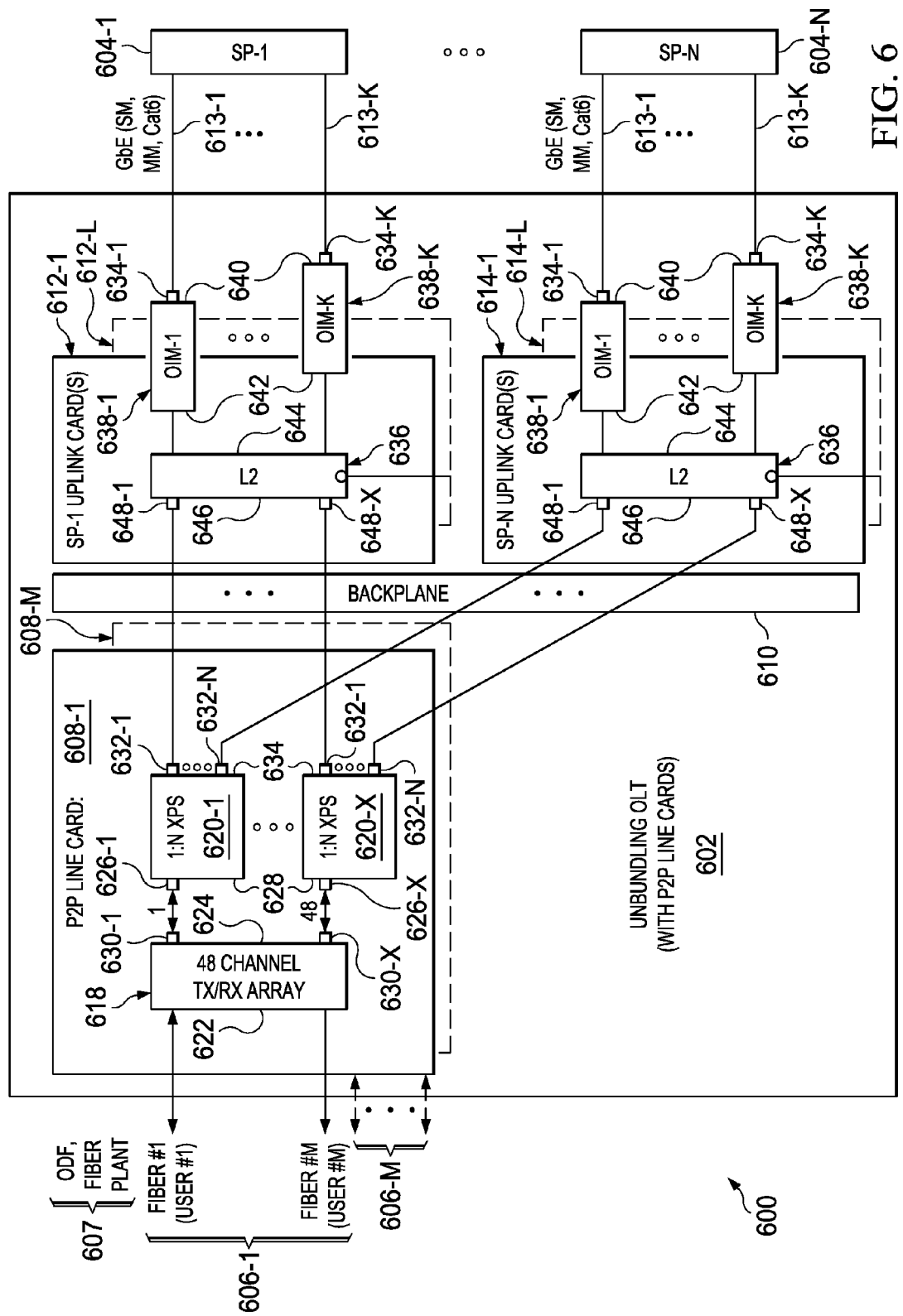
FIGS. 6-8 are block diagrams of an exemplary system which includes one or more unbundling OLTs (including p2p line cards, a backplane, and SP uplink cards) which are positioned between multiple SPs and multiple fibers in accordance with a second embodiment of the present invention.

Referring to FIG. 6, there is shown a block diagram illustrating an exemplary system 600 including an exemplary unbundling OLT 602 positioned between multiple SPs 604-1 . . . 604-N and multiple sets of fibers 606-1 . . . 606-M (associated with ODF 607) in accordance with a second embodiment of the present invention. The unbundling OLT 602 includes one or more p2p line cards 608-1 . . . 608-M, a backplane 610, one or more SP uplink cards 612-1 . . . 612-L (dedicated to SP-1 604-1), and one or more SP uplink cards 614-1 . . . 614-L (dedicated to SP-N 604-N). The p2p line cards 608-1 . . . 608-M each interface with a individual set of fibers 606-1 . . . 606-M. Plus, the p2p line cards 608-1 . . . 608-M are coupled by the backplane 610 to the SP uplink cards 612-1 . . . 612-L and 614-1 . . . 614-L. Each set of the SP uplink cards 612-1 . . . 612-L and 614-1 . . . 614-L are respectively coupled via one or more links 613-1 . . . 613-K to one of the SPs 604-1 . . . 604-N.

The p2p line cards 608-1 . . . 608-M each include a multi-channel transmitter-receiver array 618 (e.g., 48 channel Tx/Rx array 618 which uses "gray" optics over parallel fibers) and multiple L1 switches 620-1 . . . 620-X (e.g., 48 1:N XPSs 620-1 . . . 620-X). As shown, the multi-channel transmitter-receiver array 618 has a first side 622 coupled to a set of fibers 606-1 (e.g., 48 fibers 606-1) and a second side 624 coupled to the L1 switches 620-1 . . . 620-X. Each L1 switch 620-1 . . . 620-X has one port 626-1 . . . 626-X on a first side 628 connected to a port 630-1 . . . 630-X associated with one of the wavelength channels on the multi-channel transmitter-receiver array 618. Plus, each L1 switch 620-1 . . . 620-X has multiple ports 632-1 . . . 632-N on a second side 634 coupled to the backplane 610, where each port 632-1 . . . 632-N is associated with one SP 604-1 . . . 604-N.

In this example, the multi-channel transmitter-receiver array 618 is in a common package to reduce the cost of the optical transmitters and receivers. For example, the common package can contain 12 channels or even all the channels (or more) associated with the corresponding set of multiple fibers 606-1 . . . 606-M. Each electrical Tx/Rx port 630-1 . . . 630-X of the multi-channel transmitter-receiver array 618 is connected to one of the 1:N XPSs 620-1 . . . 620-X which is used to select SP(s) 604-1 . . . 604-N for each fiber in the corresponding set of multiple fibers 606-1 . . . 606-M. The XPS performs switching on L1 which is transparent to SP packets and protocols. The 1:N XPSs 620-1 . . . 620-X can be realized using a larger MxM XPS if desired. However, MxM XPS allows for more switching possibilities than required for this application and are therefore not optimal in resource utilization. The NetOp can monitor the various parts: the TRx array for optical powers etc, and can also in e.g., a round-robin fashion (using an extra XPS port) monitor the SP packet headers. Thus, the p2p line cards 608-1 . . . 608-M if desired can be totally under the control of the NetOp.

The SP uplink cards 612-1 . . . 612-L and 614-1 . . . 614-L can be totally under the control of their respective SPs 604-1 . . . 604-N. For example, SP-1 604-1 controls SP uplink cards 612-1 . . . 612-L. Each SP uplink card 612-1 (for example) is connected by one or more uplink ports 634-1 . . . 634-K via the links 613-1 . . . 613-K (e.g., GbE (SM, MM, cat6), 10 GbE (SM, MM, Cat6)) to the dedicated SP 604-1 (for example). Each SP uplink card 612-1 (for example) includes a L2 switch 636 which is connected to one or more OIMs 638-1 . . . 638-K (e.g., SFPs 638-1 . . . 638-K) which are connected to the uplink ports 634-1 . . . 634-K. Each OIM 638-1 (for example) has a first side 640 connected to one uplink port 634-1 which is coupled via one link 313-1 to the SP-1 604-1. Each OIM 638-1 has a second side 642 connected to a first side 644 of the L2 switch 636. The L2 switch 636 has a second side 646 with multiple ports 648-1 . . . 648-X connected to the backplane 610 such that one of the ports 648-1 (for example) is coupled to one of the ports 632-1 (for example) on the second side 634 of one of the L1 switches 620-1 (for example) in the p2p line card 608-1 (for example). In this configuration, each uplink port 634-1 . . . 634-K can be shared among all of the wavelength channels on the multi-channel transmitter-receiver array 618 which are supported by fibers in the corresponding set of fibers 606-1 . . . 606-M.

In this example, the L2 switch 636 at the SP uplink card 612-1 (for example) is facing the backplane 610 toward one or more p2p line cards 608-1 . . . 608-M and has a number of ports 648-1 . . . 648-X equal to the number of wavelengths on the one or more p2p line cards 608-1 . . . 608-M. For example, if the SP uplink card 612-1 is made to interface just one 48 wavelength channel p2p line card 608-1, the L2 switch 636 needs to have 48 ports 648-1 . . . 648-X facing the backplane 610 connecting to the p2p line card 608-1. This way, the backplane 610 of the unbundling OLT 602 replaces an optical patch panel as a meeting point for the SP-1 604-1. Such an optical patch panel, typically needed for physical layer unbundling, has problems with a high number of ports and resulting large size. The L2 functionality at the SP uplink card 612-1 enables efficient use of uplink ports 634-1 . . . 634-K and reduces the need for additional hardware and manual labor when the SP-1 604-1 acquires (or loses) a new (existing) wavelength/fiber. For instance, one GbE port 634-1 can be shared among all the wavelengths the SP-1 604-1 has on the fibers associated with one set of fibers 606-1 (for example). A further improvement comes when one SP-1 604-1 (for example) has multiple SP uplink cards 612-1 . . . 612-L directly connected to one another over the OLT backplane which enables one uplink port 634-1 to be shared among several sets of multiple fibers 606-1 . . . 606-M (see FIG. 7). Further, when one SP-1 604-1 (for example) has SP uplink cards 612-1 . . . 612-L equipped with a number of uplink ports 634-1 . . . 634-K (e.g., both 1 GbE and 10 GbE) these ports 634-1 . . . 634-K can be connected to one or more other SP uplink cards dedicated to SP-1 604-1 in one or more OLTs 602 and 602' to enable an increase of uplink capacity as the number of SP's fibers increase (see FIGS. 8A and 8B).

Figure 7:
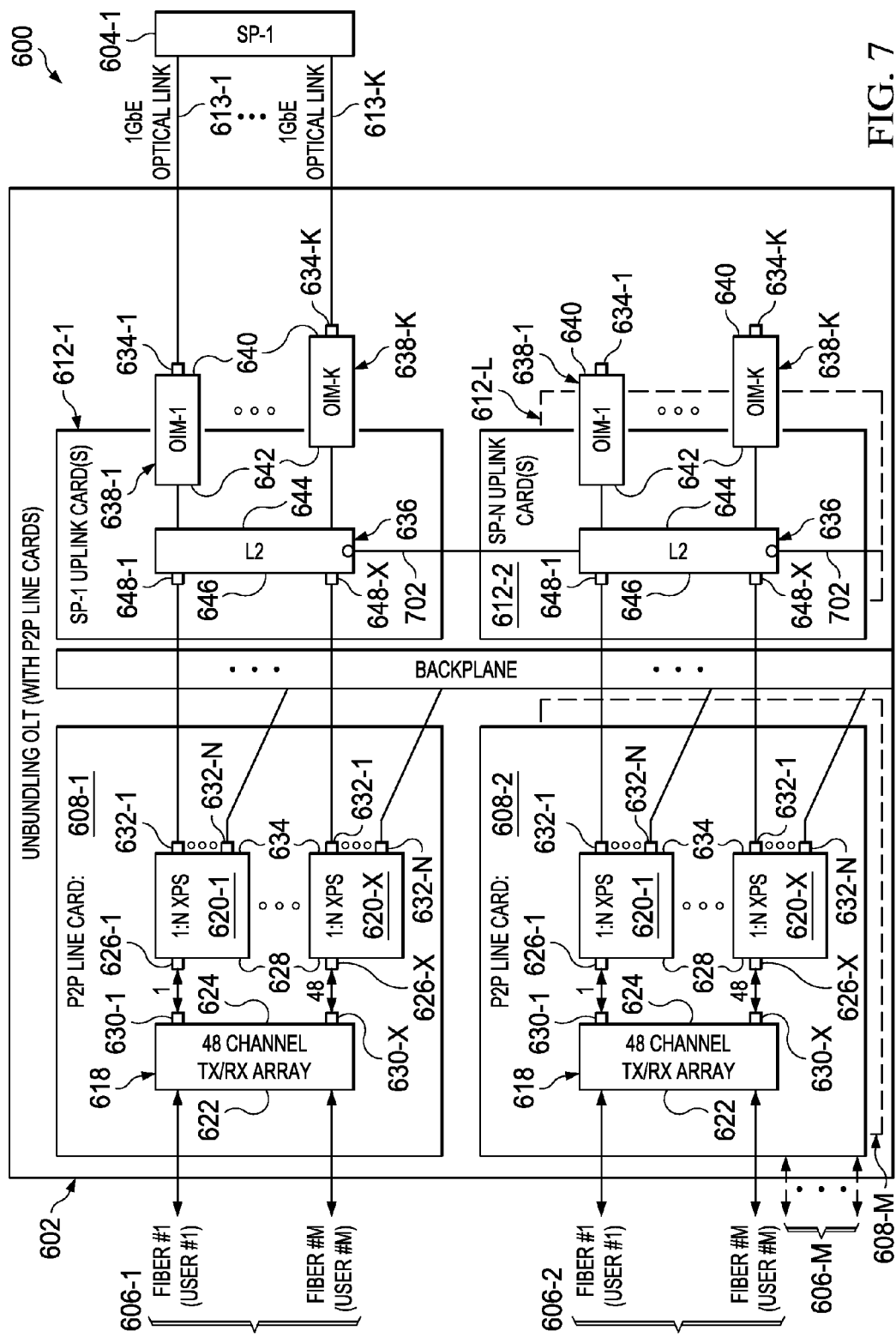

Referring to FIG. 7, there is shown a block diagram of a portion of the exemplary system 600 illustrating in greater detail a scenario where one SP-1 604-1 has multiple SP uplink cards 612-1, 612-2 . . . 612-L each of which are connected to one p2p line card 608-1, 608-2 . . . 608-M in accordance with the second embodiment of the present invention. The components within each of the SP uplink cards 612-1, 612-2 . . . 612-L and the p2p line cards 608-1, 608-2 . . . 608-M have been discussed above and are not repeated here but reference is made to the connections 702 between the SP uplink card's L2 switches 636 which enable one uplink port 634-1 (for example) to be shared among sets of fibers 606-1, 606-2 . . . 606-M (note: the connections 702 would typically be done via the backplane 610). The uplink ports 634-1 . . . 634-K can be of different media type: SM, MM, Cat6 etc, and speed (e.g., mix of 1 GbE and 10 GbE) to minimize the capital expenditure. The SP 604-1 . . . 604-N's network equipment can be located at remote sites and connected via long-haul optics to the unbundling OLT 602. Also, as each L2 switch's 636 functionality is mainly used for aggregation, this functionally is likely rather simple and the more advanced access network related traffic handling (high touch functions like subscriber management etc.) is likely located at the SP's network equipment which connect to the unbundling OLT 602. Finally, as each SP uplink card 612-1, 612-2 . . . 612-L is under the control of a specific SP-1 604-1 (for example) and the traffic is not mixed with any other SP-2 ... SP-N, the SP-1 604-1 can apply whatever L2 practice they prefer.

Figure 8A:
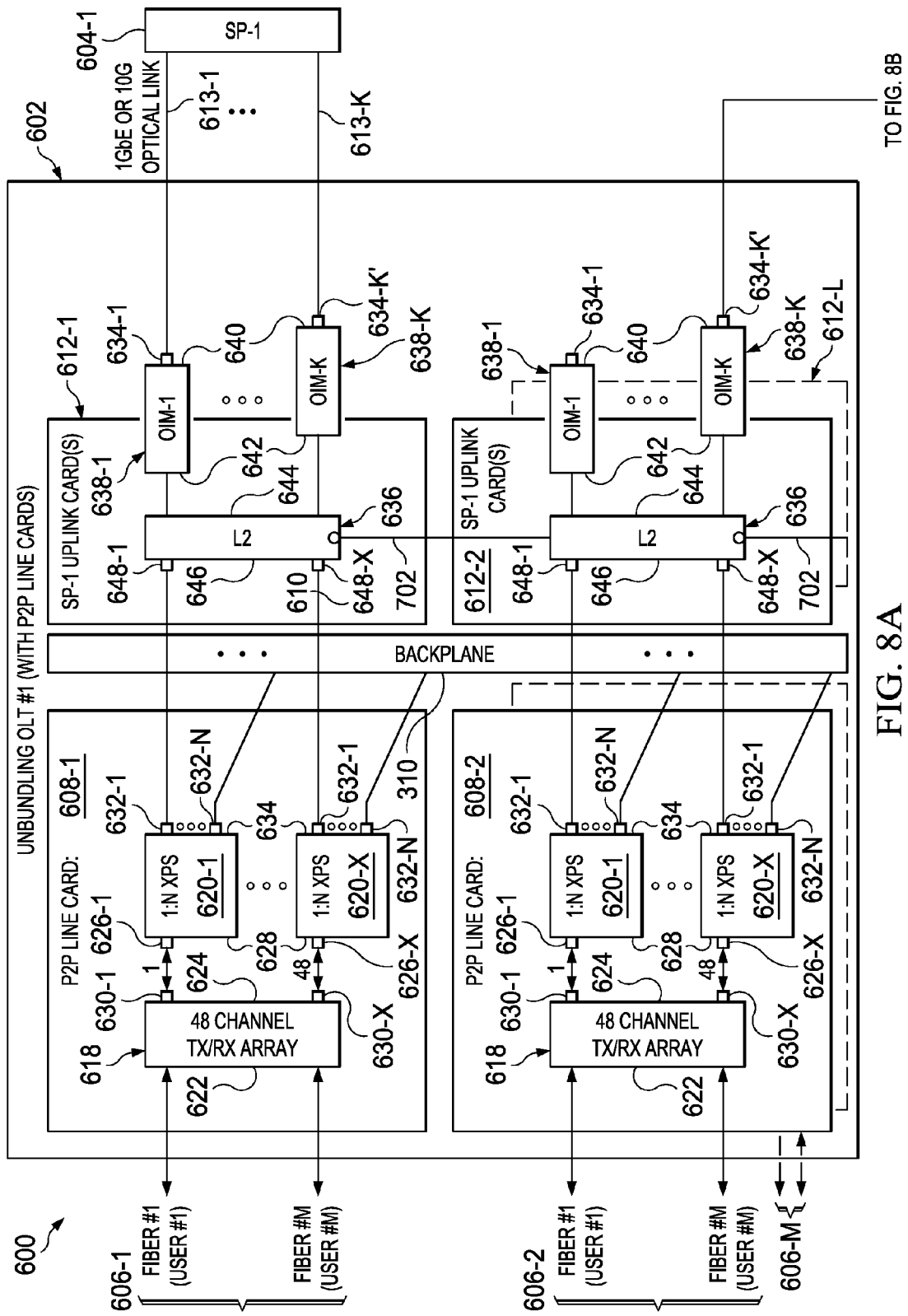
Figure 8B:
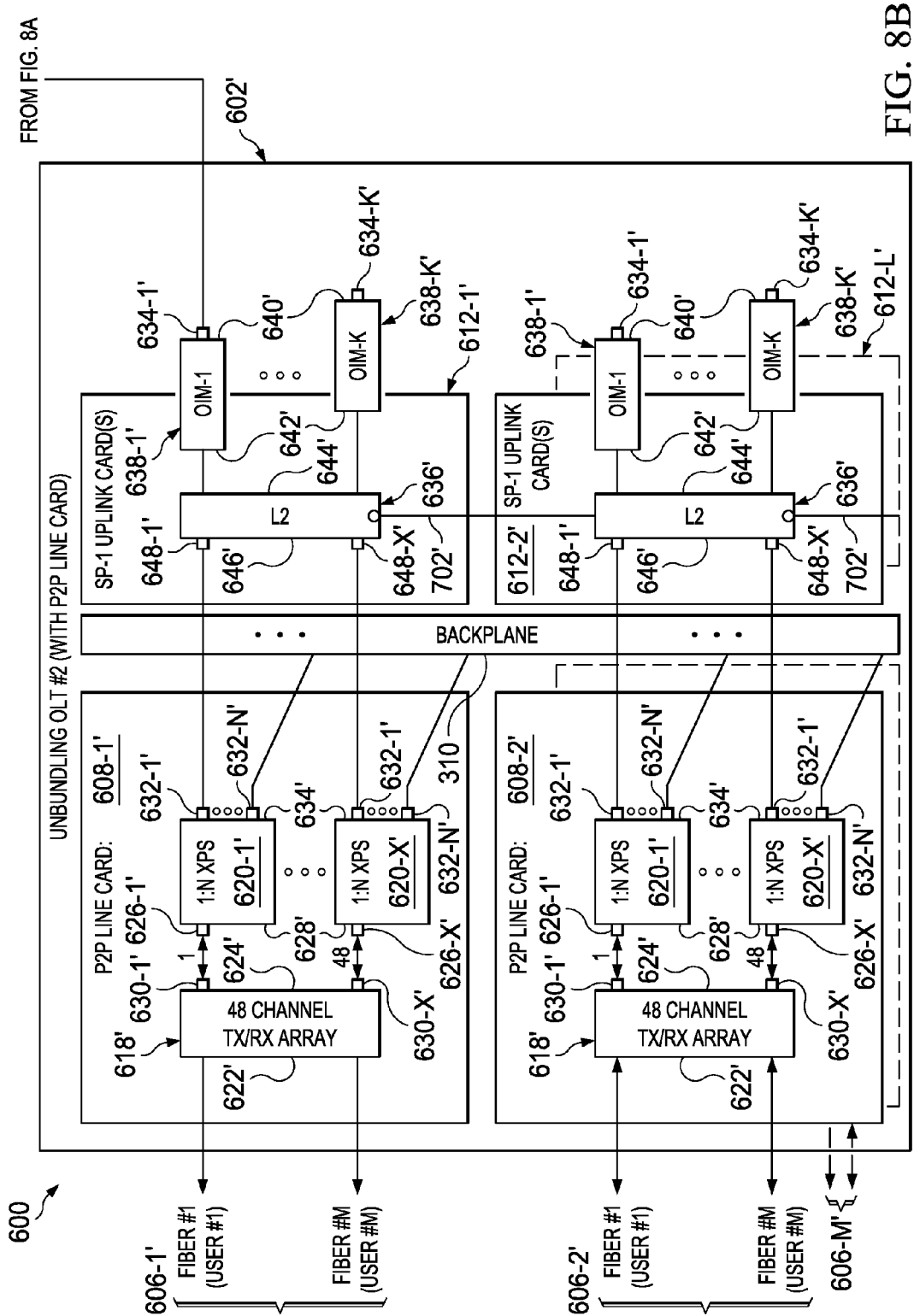

Referring to FIGS. 8A and 8B, there are shown block diagrams of the exemplary system 600 including multiple unbundling OLTs 602 and 602' (only two shown) in accordance with the second embodiment of the present invention. In this example, one SP-1 604-1 (for example) has one uplink port 634-1 (for example) shared among several sets of multiple fibers 606-1, 606-2 ... 606-M associated with one unbundling OLT 602 and the same uplink port 634-1 is also shared among several sets of multiple fibers 606-1', 606-2' ... 606-M' associated with a second unbundling OLT 602'. In particular, the one SP-1 604-1 has one uplink port 634-1 shared among several sets of multiple fibers 606-1, 606-2 ... 606-M associated with one unbundling OLT 602 by connecting multiple SP uplink cards 612-1, 612-2 ... 612-L to one another via connections 702 between the L2 switches 636 each of which in turn are connected to one p2p line card 608-1, 608-2 ... 608-M (see FIG. 7). Furthermore, the one SP-1 604-1 has one uplink port 634-1 shared among several sets of multiple fibers 606-1', 606-2' ... 606-M' associated with the second unbundling OLT 602' by connecting the OIMs 638-1 ... 638-K of one SP uplink card 612-1 (for example) in the first unbundling OLT 602 to corresponding OIMs 638-1' ... 638-K' of one SP uplink card 612-1' (for example) in the second unbundling OLT 602'. The second unbundling OLT 602' is similar to the first unbundling OLT 602 except that the components therein have a reference number of xxx' instead of reference number xxx. If desired, the exemplary system 600 can have any number of unbundling OLTs that may be or may not be connected to one another.

Figure 9:
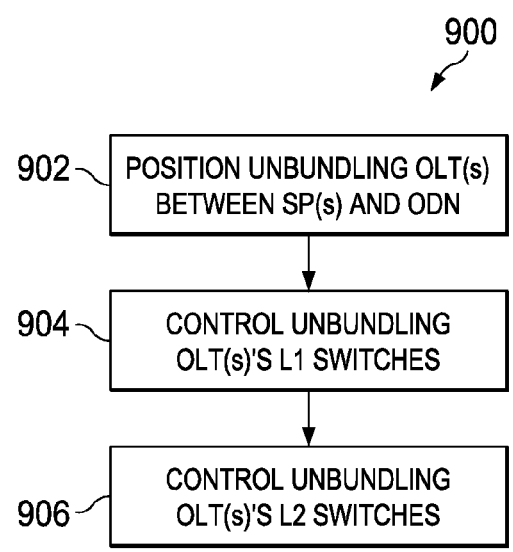
FIG. 9 is a flowchart illustrating the basic steps of a method for allowing at least two SPs to use individual fibers of an ODN in accordance with an embodiment of the present invention.

Referring to FIG. 9, there is a flowchart illustrating the basic steps of a method 900 for allowing at least two SPs 304-1 ... 304-N, 604-1 ... 604-N to use individual fibers of the ODN 307 and 607 in accordance with an embodiment of the present invention. Beginning at step 904, one or more unbundling OLTs 302, 302', 602 and 602' are positioned between at least two SPs 304-1 ... 304-N, 604-1 ... 604-N and the ODN 307 and 607. At step 906, the L1 switches 320-1 ... 320-X, 320-1' ... 320-X', 620-1 ... 620-X, 620-1' ... 620-X' are controlled to select one or more of the channels of the multi-channel transmitter-receiver array 322, 322', 622, 622' to be used for example by the first SP 304-1, 604-1. In one case, the NetOp would control the L1 switches 320-1 ... 320-X, 320-1' ... 320-X', 620-1 ... 620-X, 620-1' ... 620-X. At step 908, the L2 switches 336, 336', 636, 636' are controlled to enable for example the first uplink port 334-1 of the first SP 304-1, 604-1 to use the first set of one or more ODN fibers 306-1, 306-1', 606-1 and 606-1' associated with the ODN 307 and 607. In one case, the SP-1 304-1 and 604-1 would control the L2 switches 336, 336', 636 and 636'.

From the foregoing, one skilled in the art will appreciate that the present invention proposes to use an unbundling OLT 302 and 602 which combines in a unique manner L1 and L2 switching to enhance the capability of physical layer unbundling (Open Access). In the WDM-PON scenario, the unbundling OLT 302 has the L1 switches 320-1 ... 320-X placed on the PON line cards 308-1 ... 308-M and for each wavelength the L1 switch 320-1 ... 320-X selects one of the SP-1 ... SP-N. The L2 switches 336 are placed on the SP specific uplink cards 312-1 ... 312-L and 314-1 ... 314-L to make efficient and flexible use of optical links 313-1 ... 313-K to each SP. Thus, for example one SP GbE port 334-1 at that SP specific uplink card 312-1 could be used for different and multiple WDM-PON wavelengths, while these WDM-PON wavelengths are used exclusively by this SP-1 the traffic is not mixed with any other SP's traffic. This implies further that no manual cabling is needed when a SP acquires more wavelengths, unless the SP would like to assign more uplink bandwidth to the wavelengths it operates. The p2p scenario is the same as the WDM-PON scenario except where a fiber is used instead of a wavelength and the p2p line cards 608-1 ... 608-M do not have a WDM multiplexer 316. Furthermore, in the case of WDM-PON, the multi-channel Tx/Rx array 318 uses multiple wavelengths (i.e. WDM) on one fiber 306-1 (for example), while in the p2p case the multi-channel Tx/Rx array 618 uses multiple fibers 606-1 (for example)(i.e. one wavelength per fiber, being the same for each fiber, i.e. "gray" interfaces, as opposed to "colored" interfaces for WDM).

The present invention is described herein in an application where the traffic can be represented by L2, e.g., IP packets within Ethernet frames being transported over optical links. However, it should be appreciated that any packet based traffic can be handled in similar way (ATM, Fibre Channel, Frame relay etc). It should also be appreciated that the applications may be not only residential access but also business connections, mobile backhaul etc. In addition, mobile backhaul is sometimes performed with L1 based sampled digital data. In this case, the unbundling OLT concept of the present invention can still be used, although the SP uplink card will not include a L2 switching device, but instead in it's simplest form just an optical/electrical conversion to the unbundling OLT backplane is utilized. Lastly, it should also be appreciated that various components such as the multi-channel transmitter-receiver array, the L1 switches, the L2 switches and the OIMs have been described and claimed herein as having first sides and second sides but those sides do not necessarily need to be different physical sides on the component but could be the same physical side on the component.

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

The invention claimed is:

1. An unbundling optical line terminal, OLT, positioned between at least two service providers, SPs, and an optical distribution network, ODN, the unbundling OLT comprising:
   a first line card,
   a backplane; and
   a first uplink card, wherein the first uplink card is coupled by the backplane to the first line card;
   wherein the first line card includes a multi-channel transmitter-receiver array and a plurality of layer 1, L1, switches, wherein the multi-channel transmitter-receiver array has a first side coupled to a first set of one or more ODN fibers associated with the ODN and a second side coupled to the plurality of L1 switches, wherein each L1 switch has one port on a first side connected to a port associated with one of the channels on the multi-channel transmitter-receiver array, and wherein each L1 switch has multiple ports on a second side coupled to the backplane; and
   wherein the first uplink card is dedicated to a first SP and is connected by a first uplink port and a first link to the first SP, wherein the first uplink card includes a layer 2, L2, switch and an optical interface module, OIM, wherein the OIM has a first side connected to the first uplink port which is coupled via the first link to the first SP, wherein the OIM has a second side connected to a first side of the L2 switch, wherein the L2 switch has multiple ports on a second side connected to the backplane such that one of the ports on the L2 switch is coupled via the backplane to one of the multiple ports on the second side of one of the plurality of L1 switches in the first line card, and wherein the first uplink port is shared among all of the channels on the multi-channel transmitter-receiver array which are supported by the first set of one or more ODN fibers.

2. The unbundling OLT of claim 1, further comprises:
a second uplink card, wherein the second uplink card is coupled by the backplane to the first line card, wherein the second uplink card is dedicated to a second SP and is connected by a second uplink port and a second link to the second SP, wherein the second uplink card includes a second L2 switch and a second OIM, wherein the second OIM has a first side connected to the second uplink port which connected via the second link to the second SP, wherein the second OIM has a second side connected to a first side of the second L2 switch, wherein the second L2 switch has multiple ports on a second side connected to the backplane such that one of the ports on the second L2 switch is coupled via the backplane to one of the multiple ports on the second side of one of the plurality of L1 switches in the first line card, and wherein the second uplink port is shared among all of the channels on the multi-channel transmitter-receiver array which are supported by the first set of one or more ODN fibers.

3. The unbundling OLT of claim 1, further comprises:
an additional line card;
the backplane; and
an additional uplink card, wherein the additional uplink card is coupled by the backplane to the additional line card;
wherein the additional line card includes an additional multi-channel transmitter-receiver array and a plurality of additional L1 switches, wherein the additional multi-channel transmitter-receiver array has a first side coupled to a second set of one or more ODN fibers associated with the ODN and a second side coupled to the plurality of additional L1 switches, wherein each additional L1 switch has one port on a first side connected to a port associated with one of the channels on the additional multi-channel transmitter-receiver array, wherein each additional L1 switch has multiple ports on a second side coupled to the backplane; and
wherein the additional uplink card is dedicated to the first SP and is connected by the first uplink port and the first link to the first SP, wherein the additional uplink card includes an additional L2 switch and an additional OIM, wherein the additional OIM has a first side connected to the first uplink port which connected via the first link to the first SP, wherein the additional OIM has a second side connected to a first side of the additional L2 switch, wherein the additional L2 switch has multiple ports on a second side connected to the backplane such that one of the ports on the additional L2 switch is coupled via the backplane to one of the multiple ports on the second side of one of the plurality of additional L1 switches in the additional line card, and wherein the first uplink port is shared among all of the channels on the additional multi-channel transmitter-receiver array which are supported by the second set of one or more ODN fibers.

4. The unbundling OLT of claim 1, wherein the first line card is a first wavelength division multiplexing-passive optical network, WDM-PON, line card, and the first set of one or more ODN fibers is a first passive optical network, PON, and the first WDM-PON line card includes a WDM multiplexer coupled between the multi-channel transmitter-receiver array and the first PON.

5. The unbundling OLT of claim 1, wherein the first line card is a first point-to-point line, p2p, line card.

6. A system comprising:
at least two service providers (SPs);
a first unbundling optical line terminal (OLT); and
an optical distribution network (ODN), where the first unbundling OLT is positioned between the at least two SPs and the ODN, wherein the first unbundling OLT comprises:
a first line card,
a backplane; and
a first uplink card, wherein the first uplink card is coupled by the backplane to the first line card;
wherein the first line card includes a multi-channel transmitter-receiver array and a plurality of layer 1, L1, switches, wherein the multi-channel transmitter-receiver array has a first side coupled to a first set of one or more ODN fibers associated with the ODN and a second side coupled to the plurality of L1 switches, wherein each L1 switch has one port on a first side connected to a port associated with one of the channels on the multi-channel transmitter-receiver array, and wherein each L1 switch has multiple ports on a second side coupled to the backplane; and
wherein the first uplink card is dedicated to a first SP and is connected by a first uplink port and a first link to the first SP, wherein the first uplink card includes a layer 2, L2, switch and an optical interface module, OIM, wherein the OIM has a first side connected to the first uplink port which is coupled via the first link to the first SP, wherein the OIM has a second side connected to a first side of the L2 switch, wherein the L2 switch has multiple ports on a second side connected to the backplane such that one of the ports on the L2 switch is coupled via the backplane to one of the multiple ports on the second side of one of the plurality of L1 switches in the first line card, and wherein the first uplink port is shared among all of the channels on the multi-channel transmitter-receiver array which are supported by the first set of one or more ODN fibers.

7. The system of claim 6, wherein said first unbundling OLT further comprises:
a second uplink card, wherein the second uplink card is coupled by the backplane to the first line card, wherein the second uplink card is dedicated to a second SP and is connected by a second uplink port and a second link to the second SP, wherein the second uplink card includes a second L2 switch and a second OIM, wherein the second OIM has a first side connected to the second uplink port which connected via the second link to the second SP, wherein the second OIM has a second side connected to a first side of the second L2 switch, wherein the second L2 switch has multiple ports on a second side connected to the backplane such that one of the ports on the second L2 switch is coupled via the backplane to one of the multiple ports on the second side of one of the plurality of L1 switches in the first line card, and wherein the second uplink port is shared among all of the channels on the multi-channel transmitter-receiver array which are supported by the first set of one or more ODN fibers.

8. The system of claim 6, wherein said first unbundling OLT further comprises:
- an additional line card;
- the backplane; and
- an additional uplink card, wherein the additional uplink card is coupled by the backplane to the additional line card;
- wherein the additional line card includes an additional multi-channel transmitter-receiver array and a plurality of additional L1 switches, wherein the additional multi-channel transmitter-receiver array has a first side coupled to a second set of one or more ODN fibers associated with the ODN and a second side coupled to the plurality of additional L1 switches, wherein each additional L1 switch has one port on a first side connected to a port associated with one of the channels on the additional multi-channel transmitter-receiver array, wherein each additional L1 switch has multiple ports on a second side coupled to the backplane; and
- wherein the additional uplink card is dedicated to the first SP and is connected by the first uplink port and the first link to the first SP, wherein the additional uplink card includes an additional L2 switch and an additional OIM, wherein the additional OIM has a first side connected to the first uplink port which connected via the first link to the first SP, wherein the additional OIM has a second side connected to a first side of the additional L2 switch, wherein the additional L2 switch has multiple ports on a second side connected to the backplane such that one of the ports on the additional L2 switch is coupled via the backplane to one of the multiple ports on the second side of one of the plurality of additional L1 switches in the additional line card, and wherein the first uplink port is shared among all of the channels on the additional multi-channel transmitter-receiver array which are supported by the second set of one or more ODN fibers.

9. The system of claim 6, further comprising a second unbundling OLT that is connected to the first uplink card in the first unbundling OLT, the second unbundling OLT comprises:
- at least one line card,
- a backplane;
- at least one uplink card, wherein the at least one line, card is coupled by the backplane to the at least one uplink card;
- wherein each line card includes a multi-channel transmitter-receiver array and a plurality of L1 switches, wherein the multi-channel transmitter-receiver array has a first side coupled to another set of one or more ODN fibers associated with the ODN and a second side coupled to the plurality of L1 switches, wherein each L1 switch has one port on a first side connected to a port associated with one of the channels on the multi-channel transmitter-receiver array, and wherein each L1 switch has multiple ports on a second side coupled to the backplane; and
- wherein each uplink card is dedicated to the first SP, wherein one of the at least uplink card is connected to the first uplink card in the first unbundling OLT, wherein each uplink card includes a L2 switch and a OIM, wherein the OIM has a first side connected to another OIM in the first uplink card of the first unbundling OLT, wherein the OIM has a second side connected to a first side of the L2 switch, wherein the L2 switch has multiple ports on a second side connected to the backplane such that one of the ports on the L2 switch is coupled via the backplane to one of the multiple ports on the second side of one of the plurality of L1 switches, and wherein the first uplink port is shared among all of the channels which are supported by the first set of one or more ODN fibers and the another set of one or more ODN fibers.

10. The system of claim 6, wherein the first line card is a first wavelength division multiplexing-passive optical network, WDM-PON, line card, and the first set of one or more ODN fibers is a first passive optical network, PON, and the first WDM-PON line card includes a WDM multiplexer coupled between the multi-channel transmitter-receiver array and the first PON.

11. The system of claim 6, wherein the first line card is a first point-to-point line, p2p, line card.

12. A method for allowing at least two service providers, SPs, to use individual fibers of an optical distribution network, ODN, the method comprising the steps of:
- positioning an unbundling optical line terminal, OLT between the at least two SPs and the ODN, the unbundling OLT comprising:
  - a first line card,
  - a backplane; and
  - a first uplink card, wherein the first uplink card is coupled by the backplane to the first line card;
  - wherein the first line card includes a multi-channel transmitter-receiver array and a plurality of layer 1, L1, switches, wherein the multi-channel transmitter-receiver array has a first side coupled to a first set of one or more ODN fibers associated with the ODN and a second side coupled to the plurality of L1 switches, wherein each L1 switch has one port on a first side connected to a port associated with one of the channels on the multi-channel transmitter-receiver array, and wherein each L1 switch has multiple ports on a second side coupled to the backplane; and
  - wherein the first uplink card is dedicated to a first SP and is connected by a first uplink port and a first link to the first SP, wherein the first uplink card includes a layer 2, L2, switch and an optical interface module, OIM, wherein the OIM has a first side connected to the first uplink port which is coupled via the first link to the first SP, wherein the OIM has a second side connected to a first side of the L2 switch, wherein the L2 switch has multiple ports on a second side connected to the backplane such that one of the ports on the L2 switch is coupled via the backplane to one of the multiple ports on the second side of one of the plurality of L1 switches in the first line card, and wherein the first uplink port is shared among all of the channels on the multi-channel transmitter-receiver array which are supported by the first set of one or more ODN fibers;
- controlling the plurality of L1 switches to select one or more of the channels of the multi-channel transmitter-receiver array to be used by the first SP; and
- controlling the L2 switch to enable the first uplink port of the first SP to use the first set of one or more ODN fibers associated with the ODN.

13. The method of claim 12, wherein the unbundling OLT further comprises:
- a second uplink card, wherein the second uplink card is coupled by the backplane to the first line card, wherein the second uplink card is dedicated to a second SP and is connected by a second uplink port and a second link to the second SP, wherein the second uplink card includes a second L2 switch and a second OIM, wherein the second OIM has a first side connected to the second uplink port which connected via the second link to the second SP, wherein the second OIM has a second side connected to a first side of the second L2 switch, wherein the second L2 switch has multiple ports on a second side connected to the backplane such that one of the ports on the second L2 switch is coupled via the backplane to one of the multiple ports on the second side of one of the plurality of L1 switches in the first line card, and wherein the second uplink port is shared among all of the channels on the multi-channel transmitter-receiver array which are supported by the first set of one or more ODN fibers.

14. The method of claim 12, wherein the unbundling OLT further comprises:
an additional line card;
the backplane; and
an additional uplink card, wherein the additional uplink card is coupled by the backplane to the additional line card;
wherein the additional line card includes an additional multi-channel transmitter-receiver array and a plurality of additional L1 switches, wherein the additional multi-channel transmitter-receiver array has a first side coupled to a second set of one or more ODN fibers associated with the ODN and a second side coupled to the plurality of additional L1 switches, wherein each additional L1 switch has one port on a first side connected to a port associated with one of the channels on the additional multi-channel transmitter-receiver array, wherein each additional L1 switch has multiple ports on a second side coupled to the backplane; and
wherein the additional uplink card is dedicated to the first SP and is connected by the first uplink port and the first link to the first SP, wherein the additional uplink card includes an additional L2 switch and an additional OIM, wherein the additional OIM has a first side connected to the first uplink port which connected via the first link to the first SP, wherein the additional OIM has a second side connected to a first side of the additional L2 switch, wherein the additional L2 switch has multiple ports on a second side connected to the backplane such that one of the ports on the additional L2 switch is coupled via the backplane to one of the multiple ports on the second side of one of the plurality of additional L1 switches in the additional line card, and wherein the first uplink port is shared among all of the channels on the additional multi-channel transmitter-receiver array which are supported by the second set of one or more ODN fibers.

15. The method of claim 12, wherein the first line card is a first wavelength division multiplexing-passive optical network, WDM-PON, line card, and the first set of one or more ODN fibers is a first passive optical network, PON, and the first WDM-PON line card includes a WDM multiplexer coupled between the multi-channel transmitter-receiver array and the first PON.

16. The method of claim 12, wherein the first line card is a first point-to-point line, p2p, line card.

17. The method of claim 12, wherein a network operator controls the L1 switches.

18. The method of claim 12, wherein the first SP controls the L2 switches.

19. An unbundling optical line terminal, OLT, positioned between at least two service providers, SPs, and at least one passive optical network, PON, the unbundling OLT comprising:

a first line card,
a backplane; and
a first uplink card, wherein the first uplink card is coupled by the backplane to the first line card;
wherein the first line card includes a wavelength division multiplexing, WDM, multiplexer, a multi-channel transmitter-receiver array and a plurality of layer 1, L1, switches, wherein the WDM multiplexer has a first side coupled to a first PON and a second side coupled to a first side of the multi-channel transmitter-receiver array which has a second side coupled to the plurality of L1 switches, wherein each L1 switch has one port on a first side connected to a port associated with one of the wavelength channels on the multi-channel transmitter-receiver array, and wherein each L1 switch has multiple ports on a second side coupled to the backplane; and
wherein the first uplink card is dedicated to a first SP and is connected by a first uplink port and a first optical link to the first SP, wherein the first uplink card includes a layer 2, L2, switch and an optical interface module, OIM, wherein the OIM has a first side connected to the first uplink port which is coupled via the first optical link to the first SP, wherein the OIM has a second side connected to a first side of the L2 switch, wherein the L2 switch has multiple ports on a second side connected to the backplane such that one of the ports on the L2 switch is coupled via the backplane to one of the multiple ports on the second side of one of the plurality of L1 switches in the first line card, and wherein the first uplink port is shared among all of the wavelength channels on the multi-channel transmitter-receiver array which are supported by the first PON.

20. An unbundling optical line terminal, OLT, positioned between at least two service providers, SPs, and multiple fibers, the unbundling OLT comprising:
a first line card,
a backplane; and
a first uplink card, wherein the first uplink card is coupled by the backplane to the first line card;
wherein the first line card includes a multi-channel transmitter-receiver array and a plurality of layer 1, L1, switches, wherein the multi-channel transmitter-receiver array has a first side coupled to the multiple fibers and a second side coupled to the plurality of L1 switches, wherein each L1 switch has one port on a first side connected to a port associated with one of the wavelength channels on the multi-channel transmitter-receiver array, and wherein each L1 switch has multiple ports on a second side coupled to the backplane; and
wherein the first uplink card is dedicated to a first SP and is connected by a first uplink port and a first optical link to the first SP, wherein the first uplink card includes a layer 2, L2, switch and an optical interface module, OIM, wherein the OIM has a first side connected to the first uplink port which is coupled via the first optical link to the first SP, wherein the OIM has a second side connected to a first side of the L2 switch, wherein the L2 switch has multiple ports on a second side connected to the backplane such that one of the ports on the L2 switch is coupled via the backplane to one of the multiple ports on the second side of one of the plurality of L1 switches in the first line card, and wherein the first uplink port is shared among all of the wavelength channels on the multi-channel transmitter-receiver array which are supported by the multiple fibers.

* * * * *

UNITED STATES PATENT AND TRADEMARK OFFICE
CERTIFICATE OF CORRECTION

PATENT NO. : 8,442,401 B2  Page 1 of 1
APPLICATION NO. : 13/075300
DATED : May 14, 2013
INVENTOR(S) : Dahlfort It is certified that error appears in the above-identified patent and that said Letters Patent is hereby corrected as shown below:

In the Specification

In Column 2, Line 42, delete "WDM-PONS" and insert -- WDM-PONs --, therefor.

In the Claims

In Column 15, Line 43, in Claim 9, delete "one line," and insert -- one line --, therefor.

Signed and Sealed this
Tenth Day of December, 2013

Margaret A. Focarino
*Commissioner for Patents of the United States Patent and Trademark Office*